United States Patent [19]

Spittle

[11] Patent Number: 5,916,027
[45] Date of Patent: *Jun. 29, 1999

[54] MULCH FLAKES FOR TURF GRASS ESTABLISHMENT

[75] Inventor: Kevin S. Spittle, 7934 Ravenwood Ln., Stanley, N.C. 28164

[73] Assignee: Kevin S. Spittle, Stanley, N.C.

[*] Notice: This patent is subject to a terminal disclaimer.

[21] Appl. No.: 08/974,488

[22] Filed: Nov. 19, 1997

[51] Int. Cl.$^6$ ........................................................ A01G 7/00
[52] U.S. Cl. .................................................................. 47/9
[58] Field of Search ................................... 47/9; 111/102, 111/144

[56] References Cited

U.S. PATENT DOCUMENTS 5,301,460  4/1994  Corbitt ........................................... 47/9
5,456,733  10/1995 Hamilton, Jr. ................................. 47/9
5,585,150  12/1996 Sheehan ......................................... 47/9
5,672,434  9/1997  Dalebroux et al. ............................ 47/9
5,779,782  7/1998  Spittle ............................................ 47/9

FOREIGN PATENT DOCUMENTS 3431565  3/1985  Germany ...................................... 47/9

*Primary Examiner*—Robert P. Swiatek
*Assistant Examiner*—Son T. Nguyen
*Attorney, Agent, or Firm*—Brian M. Dingman

[57] ABSTRACT

Mulch flakes made from finely divided paper and/or wood, and a surfactant. The flakes also contain fertilizer. They are sized to approximately match the size of typical grass seed. This allows them to be mixed with seed and evenly spread with the seed over bare turf grass areas, to more effectively fill in the bare areas.

17 Claims, No Drawings

MULCH FLAKES FOR TURF GRASS ESTABLISHMENT

FIELD OF THE INVENTION

This invention relates to mulch flakes which effectively mulch a seed bed.

BACKGROUND OF THE INVENTION

Seed bed mulches accomplish a number of functions. They protect the soil and seed from water and wind erosion, reduce evaporation from the soil surface, increase the humidity of the soil, moderate temperature fluctuations at the soil surface, and dissipate the energy of falling water droplets to decrease disturbance of the soil surface.

Such mulches are used in yard patch products which are sold at retail throughout the United States. The products are sold to home owners who use the products to re-establish turf grass in bare or thin areas. These products contain hammer milled paper fiber as the mulch. This mulch has a density of approximately 2.5 pounds per cubic foot. The products include loose seed and loose fertilizer which have been mixed into the paper mulch before packaging.

During shipment of the packaged product, however, due to the size and density differential between the seed and fertilizer on the one hand, and the fine paper mulch on the other hand, much of the seed and fertilizer falls out of the paper matrix to the bottom of the bag. When the product is used, this settling has a substantial effect on the seed and fertilizer application rate, which can lead to an unacceptable grass plant coverage rate. The typical application of this product covers the ground at a thickness of approximately one inch. The fibrous nature of the paper suspends the seed within the fiber mulch matrix. After application, the suspended seed absorbs water and germinates within the mulch, rather than on the ground. The roots of these new seedlings must then grow into the soil for the seed to be established. However, if the paper mulch is not kept damp at least until the seedling root is established in the soil, the seedlings will die. This factor also affects the plant coverage rate using the product.

Still another issue with this fine paper-based mulch turf grass patch product is that its relatively low density translates into increased packaging and shipping costs relative to the square feet of lawn which can be re-seeded. Also, the retailers must devote additional shelf space to the product, which in effect makes the product more expensive. Accordingly, this hammer milled paper based patch product is less than ideal.

SUMMARY OF THE INVENTION

It is therefore an object of this invention to provide mulch flakes which are better suited as a lawn patch product.

It is a further object of this invention to provide such mulch flakes which contain within the flakes turf grass fertilizer.

It is a further object of this invention to provide such mulch flakes which are approximately the same size as grass seed so that they can remain more intimately mixed with grass seed.

It is a further object of this invention to provide such mulch flakes which are less expensive to package, ship, and deliver to customers at retail.

It is a further object of this invention to provide such mulch flakes which result in more dense turf grass establishment.

It is a further object of this invention to provide such mulch flakes which have a greater density than paper-matrix based lawn patch products, which translates into less product necessary to cover the same lawn area.

It is a further object of this invention to provide such mulch flakes which increase the percentage of germinated seed that takes root after application of the product to the soil.

This invention features mulch flakes for application to a ground surface, comprising finely-divided paper, and/or finely-divided wood, and preferably also a surfactant and a turf grass fertilizer, wherein the ingredients are intimately mixed and formed into flakes for application to a ground surface.

The finely-divided paper may be made from waste paper, in which case the mulch flakes preferably include about 80% paper. The finely-divided wood may be sawdust, in which case the mulch flakes preferably include about 20% wood. The surfactant may be polyalkylene glycol. The mulch flakes preferably include at least about 0.2% surfactant. The high surfactant level causes the flakes to very quickly absorb a substantial amount of water. The mulch flakes may also include a water absorbent polymer such as guar gum. In combination with the surfactant, the polymer causes extreme water absorption by the mulch flakes. This causes the mulch to expand tremendously when watered, resulting in the coverage in a greater percentage of the seed bed area, which then provides greater protection to the seed bed from water and wind. Additionally, the extreme water absorption reduces water run off, therefore, reducing soil loss. The polymer itself helps to hold the flake together and keep it from falling apart as it swells as it absorbs water. The polymer also increases the stickiness of the water-saturated mulch, which helps to retain the mulch in place on the seed bed.

Also featured is a turf grass seeding and mulching product comprising mulch flakes including about 80% finely-divided paper; about 20% finely-divided wood; and at least about 0.2% surfactant; wherein said paper, wood, and surfactant are intimately mixed and formed into flakes; and turf grass seed mixed with said mulch flakes; wherein said mulch flakes and said turf grass seed are to be applied in a thin layer to soil, to establish the seed in the soil. The flakes typically have a bulk density of about 5–20 pounds per cubic foot.

DESCRIPTION OF THE PREFERRED EMBODIMENTS

The mulch flakes of this invention comprise an intimately-mixed formulation of finely-divided paper, and/or finely-divided wood, shaped into a flake with a density of about 5–20 pounds per square foot. The flakes may include a surfactant, and a typical turf grass N-P-K- type fertilizer for use in newly seeded areas. The finely-divided paper and wood are extremely water absorbent in and of themselves. The addition of a surfactant increases the water retention of the paper and wood particles, and also speeds water absorption. It can double water retention and increase the absorption rate 20 fold.

One preferred embodiment of the mulch of this invention (before mixing with the fertilizer) includes: about 80%±2% finely-divided paper, about 20%±2% finely-divided wood, and about 0.2% polyalkylene glycol (a surfactant), and more preferably 0.3%±0.1% polyalkylene glycol. The mulch may include about 0.4% dark green marker dye. The mulch may also include about 1% guar gum (a water absorbent polymer), and about 0.1% of a bio-stimulant such as cold water pressed Ascophyllum Nodosum, which is a seaweed extract. The bulk density of the flakes is typically from about 5 to about 20 pounds per cubic foot (pcf), and more preferably 10–15 pcf. All percentages are weight percentages of dry mulch mixture before addition of any moisture.

The mulch flakes can be produced as follows. Waste newspapers are shredded and processed through a hammer mill. The resulting paper pieces are then introduced into a finish hammer mill. Also added to the finish hammer mill is the appropriate amount of sawdust. The approximate sizes of these components added to the finish hammer mill is as follows. The paper is pieces about ¼ to ¾ inch in length, and the sawdust sized to pass through a 20 mesh screen. The mixture exiting the finish hammer mill has added to it the correct amount of marker dye, liquid surfactant and water-absorbing polymer, if desired. Granular fertilizer is then added if desired.

The entire mixture is then processed through a conditioner, in which the correct amount of moisture is sprayed into the mixture as a fine mist as the product is agitated. The mixture is then pelletized into pellets of 3/16 inch diameter, with a length of about 1–1¼ inches. The pellets have a bulk density of about 30–35 pounds per cubic foot. The product is then cooled, to harden and dry the outside skin, to prevent mold growth, and keep the pellets from breaking apart during shipping and application.

The pellets are then granulated into flakes, having a bulk density of about 10–15 pounds per cubic foot, using known granulation equipment.

The mulch flakes having this composition and produced by this process have a size of about 1/16" to 3/8" in the longest dimension, and are up to about 1/8" thick, at most. The size can be adjusted as desired so that the size of the finished mulch flakes approximates the size of the grass seed with which the mulch flakes are mixed to form the turf grass re-seeding product. The resulting flake is free of dust and needs to be applied at thicknesses of only about one-eighth to one-quarter inch, which places the seed much closer to the soil surface at application as compared to the paper matrix based lawn patch products. This allows the grass seed to more easily establish itself in the soil, resulting in greater plant coverage rates. Additionally, since the mulch flakes have a density of about ten to fifteen pounds per cubic foot, which is four to six times the density of the paper-based lawn patch products, only one quarter to one-sixth of the volume of the product is necessary for the same coverage rates. This translates into reduced packaging, shipping, and store display space and cost.

Another advantage of the inventive mulch flakes is that it is not necessary to hammer mill the waste paper as fine as required for the paper-based lawn patch product. This results in reduced capital equipment cost and reduced energy requirements necessary to operate the production facility, both of which translate into further savings.

Other embodiments will occur to those skilled in the art and are within the following claims:

What is claimed is:

1. Mulch flakes for application to a ground surface along with turf grass seed, for establishment of turf grass, comprising:

at least one of finely-divided paper and finely-divided wood;

a surfactant; and a turf grass fertilizer;

wherein said paper, wood, surfactant and fertilizer are intimately mixed and formed into flakes, for application to a ground surface.

2. The mulch flakes of claim 1 in which said finely-divided paper includes waste paper.

3. The mulch flakes of claim 1 in which the flakes include at least about 50% paper.

4. The mulch flakes of claim 3 in which the flakes include about 80% paper.

5. The mulch flakes of claim 1 in which said finely-divided wood includes sawdust.

6. The mulch flakes of claim 1 in which the flakes include at least about 15% wood.

7. The mulch flakes of claim 1 in which said surfactant includes polyalkylene glycol.

8. The mulch flakes of claim 1 in which the flakes include at least about 0.2% surfactant.

9. The mulch flakes of claim 1 in which the flakes can retain at least about six times their weight in water.

10. The mulch flakes of claim 1 in which the flakes have a bulk density of about 5 to 20 pounds per cubic foot.

11. The mulch flakes of claim 10 in which the flakes have a bulk density of about 10–15 pounds per cubic foot.

12. The mulch flakes of claim 1 further including a water absorbent polymer.

13. The mulch flakes of claim 12 in which said water-absorbent polymer is guar gum.

14. The mulch flakes of claim 12 in which said flakes include about 1% water-absorbent polymer.

15. A turf grass seeding and mulching product, comprising mulch flakes comprising:

about 80% finely-divided paper;

about 20% finely-divided wood; and at least about 0.2% surfactant;

wherein said paper, wood, and surfactant are intimately mixed and formed into flakes; and turf grass seed mixed with said mulch flakes; wherein said mulch flakes and said turf grass seed are to be applied in a thin layer to soil, to establish the seed in the soil.

16. The turf grass seeding and mulching product of claim 15 in which the flakes have a bulk density of about 5–20 pounds per cubic foot.

17. A turf grass mulching and seeding product, comprising:

at least one of finely-divided paper and finely-divided wood formed into flakes approximately the size of turf grass seed, said flakes having a density of about 5–20 pounds per cubic foot; and turf grass seed mixed with said flakes, to accomplish a seeding and mulching formulation.

* * * * *